May 28, 1929.　　　　L. I. CLARK　　　　1,715,056
CABLE STRAINING ANCHORAGE CLAMP
Filed Feb. 11, 1928
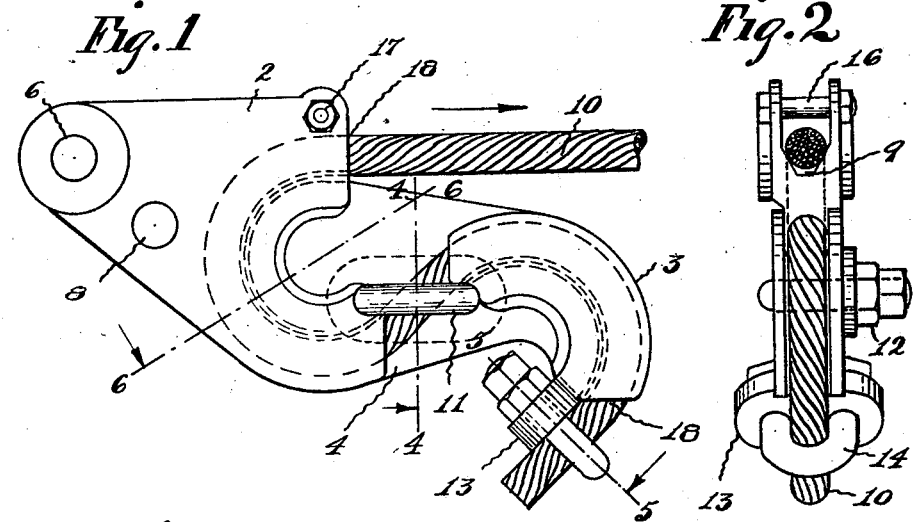
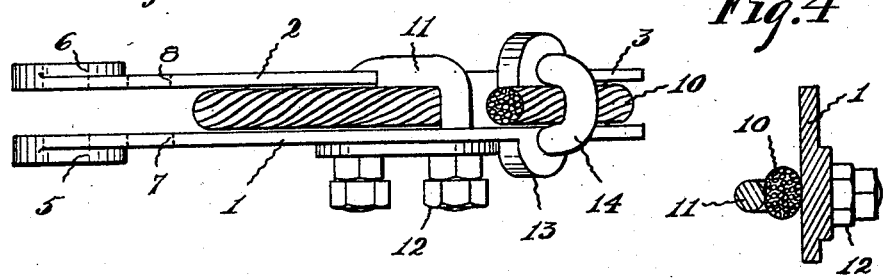
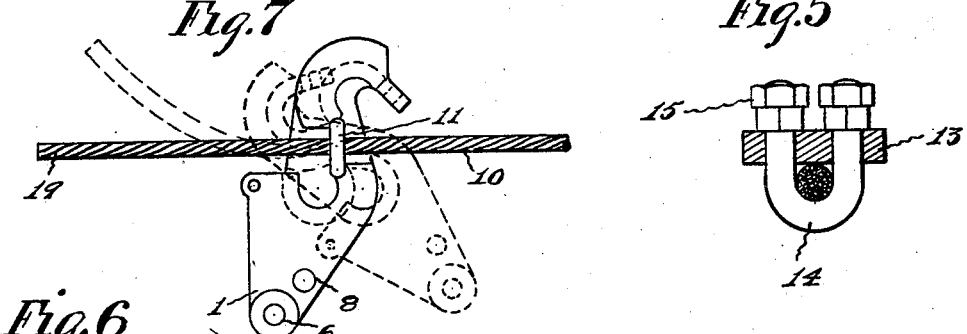
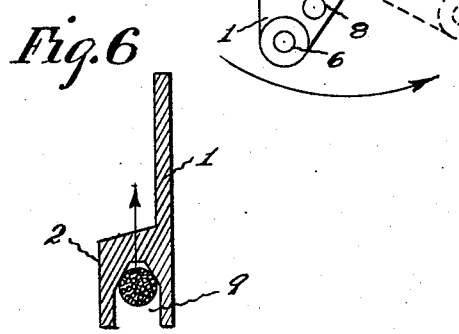
INVENTOR
Luther I. Clark,
BY
Harold D. Penney, ATTORNEY Patented May 28, 1929.

1,715,056

UNITED STATES PATENT OFFICE.

LUTHER I. CLARK, OF NEW YORK, N. Y.

CABLE-STRAINING ANCHORAGE CLAMP.

Application filed February 11, 1928. Serial No. 253,696.

My invention relates to strain clamps and particularly to a suspension clamp for securing and anchoring cables, conductor wires, guy wires or like members to supports therefor.

One of the main objects of my invention is to provide a transmission line or cable clamp which can be easily applied to a conductor, cable or guy wire and advantageously employed for either strain or anchor position.

Another object of my invention is to provide a clamp for anchoring or straining cables and the like which can be applied to the cable by merely engaging the cable at one position by the clamp, and then rotating the clamp relative to the cable to wind the cable into true snubbing position.

Another object of my invention is to provide a strain clamp having a cable receiving seat of wedge shape whereby increase of load upon the cable will result in increasing positive grip, between the opposing walls of the wedge seat and the cable.

Still another object of my invention is to provide positive securing means on a cable strain clamp which shall cooperate with the wedge seat mentioned above to positively grip the cable against slipping and in snubbing position.

A still further object of my invention is to provide a clamp of maximum strength value, said clamp having opposite arcuate cable receiving portions, each of said arcuate portions being provided with seats formed by tapering walls, whereby a cable may be effectively snubbed.

And still further objects of the invention are to provide a clamp of the class named which shall be economical to manufacture, easy to install, efficient in operation, in which shall minimize the danger of injury to the supported cable or like member.

With these and other objects in view the invention further consists in the combination, arrangement and construction of the several parts hereinafter described and pointed out in the various claims.

In the drawings wherein similar reference characters designate corresponding parts in the several views:

Fig. 1 is an elevation of the clamp connected to a cable and shown in strain position.

Fig. 2 is an end elevational view of the clamp in strain position.

Fig. 3 is a bottom plan view of the clamp in strain position.

Fig. 4 is a detail sectional view on the line 4—4 of Fig. 1, viewed in the direction of the arrow.

Fig. 5 is a detail sectional view on the line 5—5 of Fig. 1, viewed in the direction of the arrow.

Fig. 6 is a sectional view along line 6—6 of Fig. 1, looking in the direction of the arrow.

Fig. 7 is an elevation of the clamp and the cable in unwound position showing the method of winding the cable in position on the clamp.

As shown in Fig. 1, the clamp consists of a metallic body 1, having integral therewith a major sheave-like cable seat 2 and a minor sheave-like cable seat 3. These sheaves are separated by a gap 4, thus exposing the body 1. The purpose of this opening is for easy positioning of the cable therein, in applying the device.

Both body 1 and major sheave 2 are equipped with holding lugs in the form of eye bars 5 and 6 respectively.

The eye bars 5 and 6 are provided with anchor bolt holes 6, whereby to permit the affixing of the device to any suitable anchorage means not shown by the usual understood anchorage bolt, not shown. These eye bars are further provided with supplemental holes 8, which are utilized to receive a bolt or hook, not shown, whereby to temporarily attach a block and fall, or other suitable straining means, whereby the snubber and its engaged cable may be pulled to strained and anchorage engaging position, to permit the introduction of the permanent anchor bolt between the snubber and permanent anchoring means.

Each of the sheaves 2 and 3 have tapered wedge seats 9 at their junction with the body 1. These seats, of course, are not limited to the shape as shown. It is sufficient if they are so designed that movement of the cable 10 in the direction of the arrow, shown in Fig. 6, wedges the cable firmly between the walls 2 and 1 or 3 and 1. It should be observed that there is thus provided opposite arcuate cable receiving sheaves having wedge or tapered seats that positively grip the cable as the load on the cable increases.

In order to positively position and grip the cable 10 in its exposed position at the gap 4, a U bolt 11 is affixed to the body 1 by bolt nuts 12. This bolt has a further function as will be later explained.

A bolt lock seat 13 is formed integral with the body 1 and minor sheave 3 and receives a U bolt 14 locked thereto by nuts 15. This bolt functions to positively position and grip the end of the cable in snubbed position. Affixed to the body 1 and the major sheave 2 is a third bolt 16 secured thereby by a nut 17, which positively retains or positions the cable 10 in the wedge seat 9.

The end 18 of the wedge seats may be crescent shaped, if desired, to facilitate the laying of the cable thereon.

The method of straining or anchoring the cable 10 is as follows:—

Assuming the cable in the position shown in Fig. 7, the cable end 19 is passed through the U bolt 11 and the latter is then locked securely against the cable. By rotating the clamp about the bolt 11 as a center in the direction of the arrow, the clamp assumes the position shown by the dotted lines in Fig. 7. While the clamp is being rotated about an axis normal to the direction of the load on the cable, the cable is being wound about the arcuate wedge seats 9. It should be observed that all the rotation is in a single plane, which also is the plane of the direction of the load on the cable.

The bolt 16 and the U bolt 14 are finally secured to the clamp when the cable has been wound about the wedge seat, thus positively gripping the cable thereto. The clamp is then connected to its anchorages as previously described. When the cable 10 is pulled taut the action of the clamp is obvious. Due to the U bolts 11 and 14 the cable is positively gripped. It will be noticed that the greater the load on the cable, the greater will the tendency be to accentuate the snubbing action and wedge the cable into the arcuate wedge seats.

It is to be understood that the clamp can be used to take up slack in a cable secured at both ends. The bolt need only be removed to allow the cable to be positioned in the gap. The bolt then is fixedly secured thereto thus positively gripping the cable in position. The succeeding operations are then as described heretofore.

Again pointing out that variations in detail are readily possible without losing the general advantages of the construction, I claim as my invention:

1. A holder for cables comprising a clamping member, a snubbing member associated therewith and revoluble about said clamping member as a center for winding the cable about said snubbing member in a single plane, and a second clamping means associated with said snubbing member for preventing the unwinding of the snubbed end of said cable.

2. A clamp adapted to support a cable in either strain, anchor or other position, said clamp having an S shaped wedge seat portion, means associated with a portion of the S shape for maintaining the cable in contact with said seat portion, and means associated with the ends of the S shape for gripping a portion of the cable whereby a snubbing action is obtained for increasing the holding power of the clamp.

3. A strain clamp adapted to support a cable in strain or anchor position comprising a curvilinear wedge seat snubbing member, and a plurality of bolt means associated with said member adapted to firmly seat said cable in said wedge seat, one of said bolts positively positioning said cable in a direction opposite to the load on the cable.

4. In combination, a cable, a clamp therefor to support a cable in strain or anchor position comprising a cable seat portion adapted to seat said cable therein in a single plane in the same and opposite directions of the load on the cable, means associated with said seat portion to positively position said cable in the direction of said load, and a second means associated with said seat portion to positively position said cable in the direction opposite to said load.

5. A cable strain clamp comprising an S shaped saddle member provided with a wedge seat to receive said cable, a bolt associated with one end of said member to positively position said cable in said seat in the direction of the load on the cable, a U bolt associated with said member to positively position said cable in said seat in a direction opposite to the direction of the load on the cable, a second U bolt assocated with said member to positively position said cable intermediate of said above directions.

6. A cable strain clamp comprising a saddle member, bolt means associated with said saddle member to positively grip said cable against said member, means associated with said member providing opposed arcuate cable snubbing portions having wedge seats, a second bolt means associated with one of said arcuate portions and cooperating with said first bolt means to positively position said cable within the seat thereof, and a third bolt means associated with the other of said arcuate portions and cooperating with said first bolt means to positively position said cable within the seat thereof.

7. A cable strain clamp comprising a cable seat portion adapted to seat a cable therein in the same and opposite directions of the load on the cable, and means associated with said seat portion to positively position said cable in the direction opposite to said load.

Signed at New York in the county of New York and State of New York this 10th day of February A. D. 1928.

LUTHER I. CLARK.